(12) United States Patent
Krummell et al.

(10) Patent No.: US 8,739,985 B2
(45) Date of Patent: Jun. 3, 2014

(54) PUSH-BACK CART STORAGE SYSTEM WITH A TOP CART ROLLING ON TOP OF PUSH-BACK RAILS

(75) Inventors: John Krummell, Long Beach, CA (US); Kenneth Davison, Palos Verdes Estates, CA (US)

(73) Assignee: J. C. M. Industries, Inc., Garden Grove, CA (US)

( * ) Notice: Subject to any disclaimer, the term of this patent is extended or adjusted under 35 U.S.C. 154(b) by 352 days.

(21) Appl. No.: 12/969,439

(22) Filed: Dec. 15, 2010

(65) Prior Publication Data

US 2012/0152875 A1 Jun. 21, 2012

(51) Int. Cl.
*A47F 5/00* (2006.01)
(52) U.S. Cl.
USPC .......................................... 211/151; 211/162
(58) Field of Classification Search
USPC ............ 211/151, 59.2, 126.15, 162; 414/266, 414/276, 286; 312/334.7, 334.8, 334.12, 312/334.13, 334.39, 334.41, 334.42
See application file for complete search history.

(56) References Cited

U.S. PATENT DOCUMENTS

| | | | | |
|---|---|---|---|---|
| 4,482,066 A | * | 11/1984 | Dykstra | 211/151 |
| 4,687,404 A | * | 8/1987 | Seiz et al. | 414/276 |
| 4,773,546 A | * | 9/1988 | Konstant | 211/151 |
| 4,915,240 A | * | 4/1990 | Konstant | 211/151 |
| 4,949,852 A | * | 8/1990 | Allen | 211/151 |
| 4,955,489 A | * | 9/1990 | Allen | 211/151 |
| 4,982,851 A | * | 1/1991 | Konstant | 211/151 |
| 4,988,251 A | * | 1/1991 | Kinney | 414/276 |
| 5,080,241 A | * | 1/1992 | Konstant | 211/151 |
| 5,137,159 A | * | 8/1992 | Collins et al. | 211/151 |
| 5,141,118 A | * | 8/1992 | Gay | 211/151 |
| 5,170,896 A | * | 12/1992 | Konstant | 211/151 |
| 5,180,069 A | * | 1/1993 | Krummell et al. | 211/151 |
| 5,184,738 A | * | 2/1993 | Allen | 211/151 |
| 5,203,464 A | * | 4/1993 | Allen | 211/151 |
| 5,285,909 A | * | 2/1994 | Slater | 211/151 |
| 5,312,004 A | * | 5/1994 | Krummell et al. | 211/151 |
| 5,328,038 A | * | 7/1994 | Allen | 211/151 |
| 5,348,169 A | * | 9/1994 | Allen | 211/151 |
| 5,350,270 A | * | 9/1994 | Stallard et al. | 414/276 |
| 5,393,188 A | * | 2/1995 | Scott et al. | 414/276 |
| 5,415,300 A | * | 5/1995 | Krummell et al. | 211/151 |

(Continued)

*Primary Examiner* — Joshua Rodden
*Assistant Examiner* — Stanton L Krycinski
(74) *Attorney, Agent, or Firm* — Kenneth H. Ohriner; Perkins Coie LLP

(57) ABSTRACT

In a push back cart rack storage system, the top or first cart, as well as the second cart, may be made with less material, and may be significantly simpler and lighter in comparison to existing designs. A push-back cart storage system has a single pair of push-back rails in each lane. A third cart has front and back wheels rolling on a lower inside flange of the push-back rails. A second cart has front wheels rolling on a lower inside cart flange of side rails of the third cart, and has rear wheels rolling on the lower inside flange of the push-back rails. A first or top cart has front and rear wheels rolling on a top surface of the push-back rails. The wheels on the first cart may be inner facing wheels while the wheels on the other carts may be outer facing wheels. The push-back rails and the side rails of the carts may be generally C-shaped channel sections. The top cart and the second cart may be made of angle sections to reduce the weight of the cart and the amount of material needed to manufacture the cart.

10 Claims, 3 Drawing Sheets

(56) References Cited

U.S. PATENT DOCUMENTS

| | | | |
|---|---|---|---|
| 5,419,444 A * | 5/1995 | Strom | 211/151 |
| 5,476,180 A * | 12/1995 | Konstant | 211/151 |
| 5,482,422 A * | 1/1996 | Hammond | 414/276 |
| 5,524,776 A * | 6/1996 | Hall et al. | 211/151 |
| 5,595,311 A * | 1/1997 | Allen | 211/151 |
| 5,598,934 A * | 2/1997 | Krummell et al. | 211/151 |
| 5,848,713 A * | 12/1998 | Allen | 211/151 |
| 6,068,141 A * | 5/2000 | Mulholland | 211/151 |
| 6,092,677 A * | 7/2000 | Krummell et al. | 211/151 |
| 6,129,223 A * | 10/2000 | Krummell | 211/151 |
| 6,158,943 A * | 12/2000 | Sullivan | 414/286 |
| 6,648,573 B1 * | 11/2003 | Davison | 414/276 |
| 6,851,562 B2 * | 2/2005 | Gorniak et al. | 211/59.2 |
| 7,114,904 B2 * | 10/2006 | Charbonneau et al. | 414/276 |
| 7,140,503 B2 * | 11/2006 | Krummell et al. | 211/151 |
| 2004/0112851 A1 * | 6/2004 | Gorniak et al. | 211/151 |
| 2005/0082246 A1 * | 4/2005 | Krummell et al. | 211/151 |
| 2006/0045672 A1 * | 3/2006 | Maynard et al. | 414/276 |

* cited by examiner

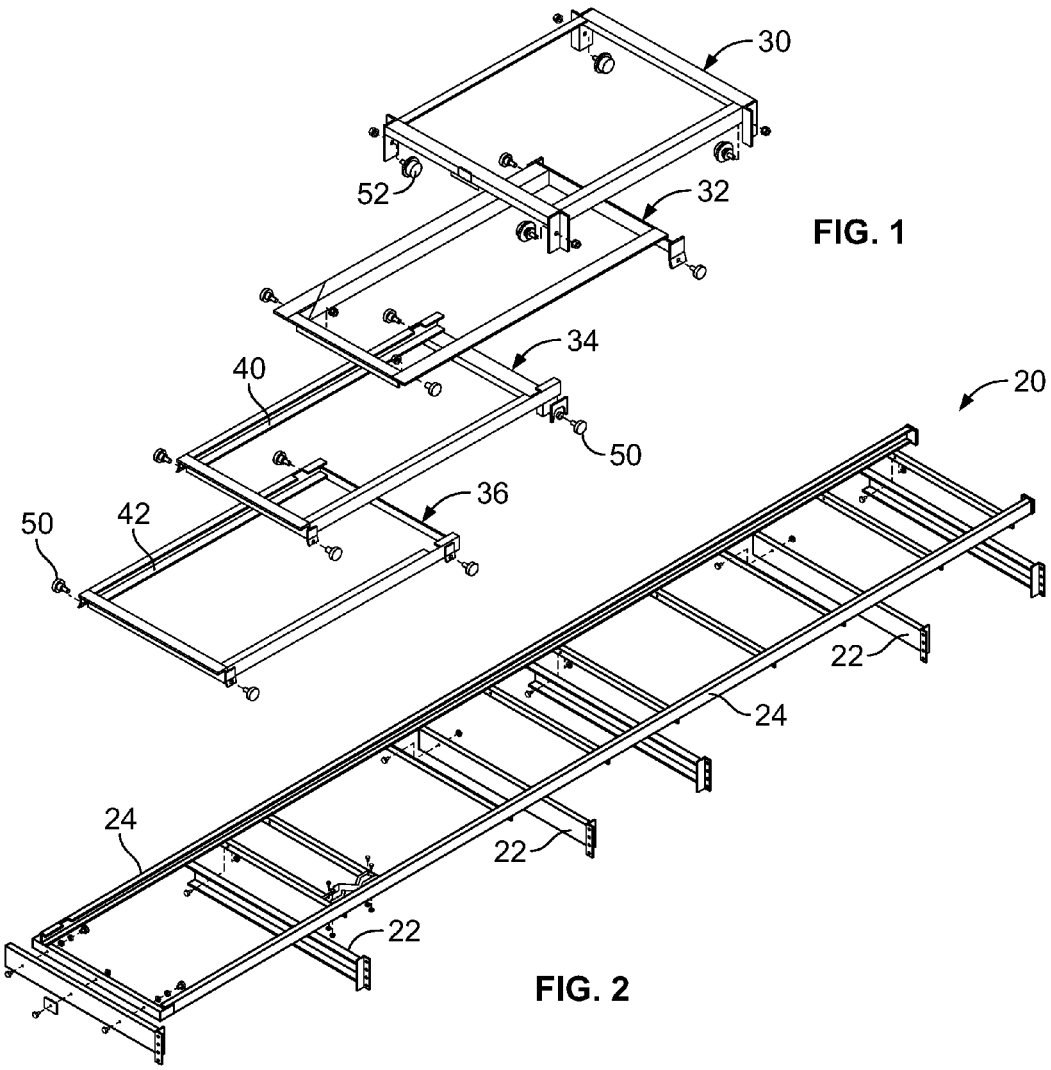
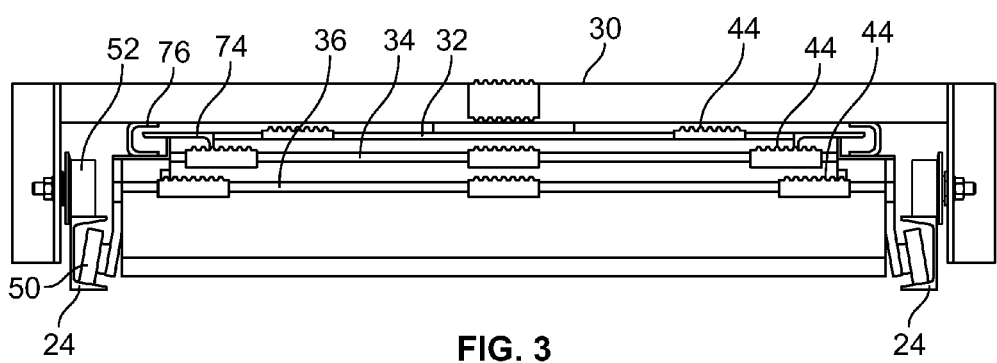

PUSH-BACK CART STORAGE SYSTEM WITH A TOP CART ROLLING ON TOP OF PUSH-BACK RAILS

BACKGROUND OF THE INVENTION

The field of the invention is pushback cart storage systems. Push-back cart storage systems are typically used in warehouses and other storage facilities to efficiently store loaded pallets. Push-back cart storage systems typically include carts for supporting pallets, with the carts having wheels that roll along inclined push-back rails on storage racks or frames, and/or along tracks in other carts. The push-back rails are inclined so that gravity assists in moving the carts forward along the rails to the front of the rack. A storage rack may include several levels of stacked lanes for storing several pallets vertically.

By providing one or more rolling carts on a set of rails, pallets may be loaded onto carts and pushed back along the rails toward the rear of the storage rack. In this way, pallets are stored one in front of the other on the storage rack, and several pallets may be loaded and unloaded from a single aisle. As a result, the number of aisles required for forklifts to maneuver throughout a warehouse is minimized, and the usable space between aisles is therefore increased. Accordingly, aisle space required for forklift access when using conventional storage rack systems may instead be used for additional pallet storage racks, thus providing more efficient use of space.

Various pushback cart storage systems have been successfully used in the past. While these systems have been effective, there is a need for improved designs that reduce overall system cost while maintaining storage efficiency.

SUMMARY OF THE INVENTION

A new push-back storage system has now been invented. In this new design, less material is used in comparison with earlier known designs, while maintaining equivalent capacity and performance. The top or first cart, as well as the second cart, require less material, and may be significantly simpler and lighter in comparison to existing designs.

In a first aspect, this new push-back storage system may have a single pair of push-back rails in each push-back lane. A third cart has front and back wheels rolling on a lower inside flange of the push-back rails. A second cart has front wheels rolling on a lower inside cart flange of side rails of the third cart, and has rear wheels rolling on the lower inside flange of the push-back rails. A first or top cart has front and rear wheels rolling on a top surface of the push-back rails. In a second aspect, the wheels on the first cart may be inner facing wheels while the wheels on the other carts may be outer facing wheels. In another aspect, the push-back rails and the side rails of the carts may be generally C-shaped channel sections. One or more aspects of the invention may be separately used. Other and further objects and advantages will become apparent from the following drawings and detailed description.

BRIEF DESCRIPTION OF THE DRAWINGS

In the drawings, the same reference number indicates the same element in each of the views.

FIG. 1 is a perspective view of the carts in one example of a new push-back storage system.

FIG. 2 is a perspective view of the rack and push-back rails used in the new system.

FIG. 3 is a section view of the carts shown in FIG. 1.

DETAILED DESCRIPTION OF THE DRAWINGS

As shown in FIGS. 1 and 2, a push-back storage system 20 includes a pair of push-back rails 24 attached to a rack 22. The specific design shown is a five-deep design and has four rolling carts. Each of the four carts 30, 32, 34 and 36 can hold one pallet, and a fifth pallet may be placed directly on the rails 24 in the front-most position. FIGS. 1-2 show a single lane of a push-back system. Typically, a large number of lanes are provided side-by-side in the rack 22, and lanes are also stacked vertically, to increase the storage capacity of the system 20. The rack 22, push-back rails 24 and the second, third and fourth carts may be provided as described in U.S. Pat. Nos. 7,140,503; 6,129,223; 5,415,300; and 5,598,934, incorporated herein by reference.

Figure 4:
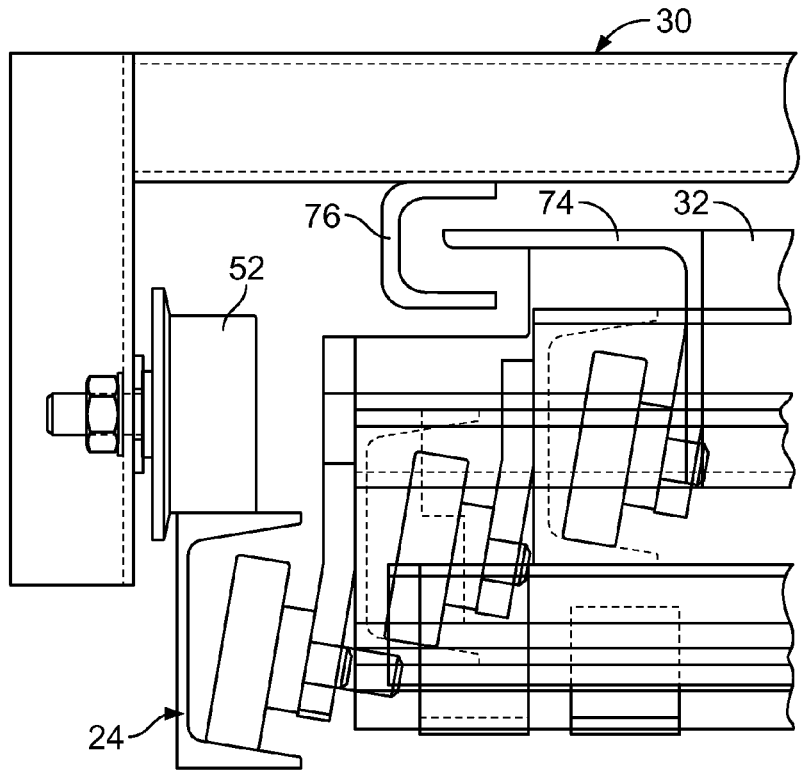
FIG. 4 is an enlarged detail view of the left side of FIG. 3.

As shown in FIGS. 3 and 4, each push-back rail 24 may be provided as a generally C-shaped steel channel section having a top flange 26 and a bottom flange 27 joined to a web section 25. This type of channel section is generally available as a hot-rolled steel shape. The flanges 26 and 27 of the rails 24 face inwardly towards each other. Each cart 30, 32, 34 and 36 has left and right side front and rear wheels, with each of the four wheels on each cart located adjacent to a corner of the cart.

FIG. 4 shows the front wheel arrangements on the left side of the carts. The front wheel arrangement on the right side of the carts is a mirror image of the left side. As shown in FIGS. 3 and 4, all of the wheels 50 of the fourth cart 36 roll on the top surface of the lower flange 27 of the push-back rails 24. The front wheels 50 of the third cart 34 roll on the lower flange 43 of the side rail 42 of the fourth cart 36. The rear wheels 50 of the third cart 34 roll on the top surface of the lower flange 27 of the push-back rails 24. The front wheels 50 of the second cart 32 roll on top surface of the lower flange 41 of the side rail 40 of the third cart 34. The rear wheels 50 of the second cart 34 roll on the top surface of the lower flange 27 of the push-back rails 24. Accordingly, the rear wheels of second, third and fourth carts roll on the top surface of the lower flange 27 of the push-back rails 24. As the rear wheels of the second, third and fourth carts are generally in front-to-back alignment with the front wheels 50 on the fourth cart 36, the rear wheels 50 on the second, third and fourth carts are not visible in FIGS. 3 and 4.

The front and rear wheels on the second, third and fourth carts are outer wheels in the sense they extend outwardly from the sides of the cart. These wheels may be attached to axles inclined at a slight upward angle, as shown in FIG. 4, so that the wheels roll generally flat on the angled top surface of the flanges 27, 44 and 41. The wheels 50 can then have a constant diameter and a flat rolling surface, rather than a conical rolling surface.

Figure 5:
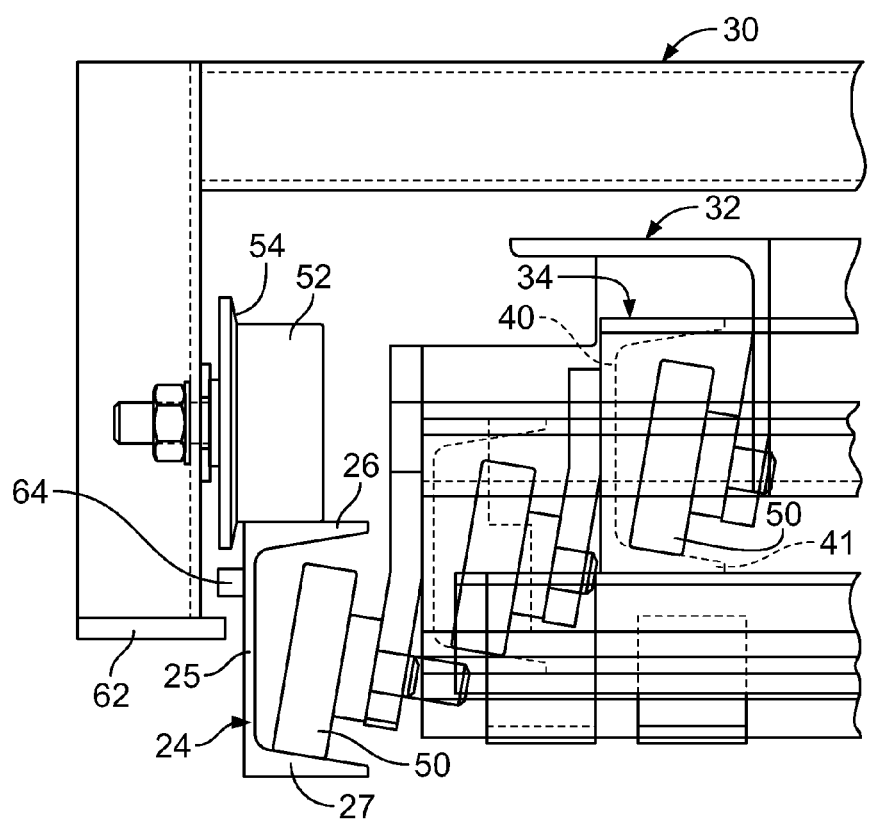
FIG. 5 is an enlarged detail view similar to FIG. 4 and showing a second embodiment.

As shown in FIGS. 3-5, each of the four wheels 52 of the top or first cart 30 is an inner wheel in the sense that these wheels 52 extend inwardly from the sides of the first cart 30. Each wheel 52 rolls on the generally flat top surface of the top flange 26 of the push-back rails 24. The wheels 52 may have a flange or lip 54 to help keep the top cart 30 aligned on the rails 24. Although angled wheels are shown, non-angled wheels on horizontal axles may also be used.

Also as shown in FIGS. 3 and 4, the top flange 74 of the angle section forming the side member of the second cart 32 may extend into a C-shaped channel section 76 attached to the underside of the top cart 30, inboard from the wheels 52 of the top cart 30. The channel section 76 may be continuous from the front to the back end of the cart 30 or short front and rear segments of a channel section 76 may be used. The angle section used for the side member of the second cart may be selected to provide sufficient flange width to extend into the channel section 76, as shown in FIG. 4. For example, a 3×2 inch angle may be used for the side member of the second cart, instead of a 2×2 inch angle. The arrangement of the flange 74 extending into the channel section 76 prevents the top cart 30 from lifting off of the second cart 32.

FIG. 5 shows an alternative design for preventing the top cart from lifting off of the second cart 32. In the design shown in FIG. 5, an inwardly projecting lip or edge 62 adjacent to the bottom of the side member of top cart 30 extends under a retaining bar or block 64 attached to the back or outside surface of the push-back track 24. As in the design shown in FIG. 4, the projecting lip 62 and/or the retaining bar 64 may be continuous or provided in discrete segments.

Figure 6:
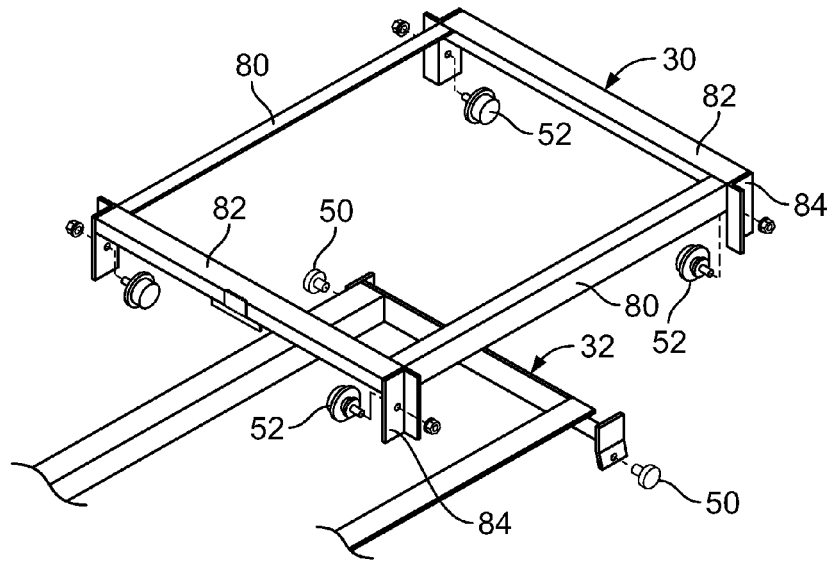
FIG. 6 is a perspective view of the first or top cart shown in FIG. 1.

FIG. 6 shows a top cart 30 made substantially entirely of steel angle sections. The side sections 80 of the cart 30 may be angle sections facing inwardly towards each other, with the front and back sections 82 also made of angle sections also facing towards each other. Vertical wheel supports 84 at each corner may similarly be made of angle sections cut to the desired length at the front and back corners of the cart. The supports 84 may face outwardly, with the back sides of each support joined, e.g., welded to an adjoining side section 80 and a front or back section 82. The second cart may have a similar construction with the top cart being shorter than the second cart, resulting in significant reduction in the weight and material used in the carts.

Figure 7:
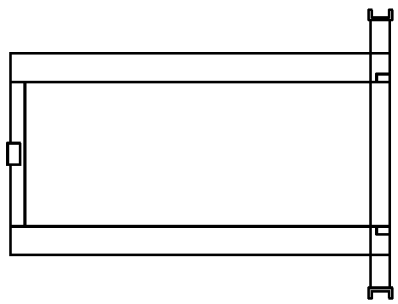
FIGS. 7, 8 and 9 are top, end and side views, respectively, of a prior art cart.
Figure 8:
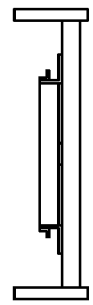
Figure 9:
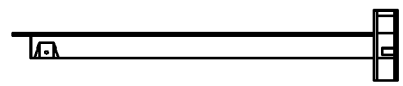
Figure 10:
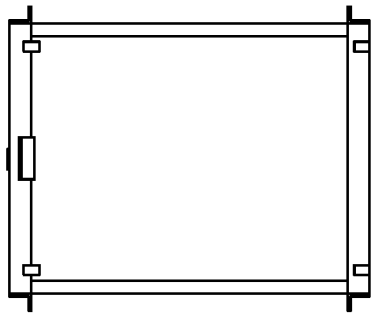
FIGS. 10, 11 and 12 are top, end and side views, respectively, of an embodiment of the present cart.
Figure 11:
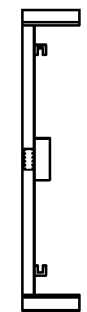
Figure 12:

The design described above can save about 60 lbs of steel per lane in comparison to existing push-back storage systems. This results in approximately at 10% reduction in total system cost. For example, FIGS. 7-9 show the top cart in a 5-deep push back rack design, with the top cart weighing about 79 lbs. In contrast, FIGS. 10-12 show a new top cart for a 5-deep push back rack system, as shown in FIGS. 1-2, that weighs only about 57 lbs. Accordingly, the new cart reduces the top cart weight by over 25%. In the new 5-deep push back rack design, the second cart (directly under the top cart) can also be similarly made lighter. For example, in prior art designs, the first and second carts together weigh about 168 lbs. compared to about 113 lbs in the new design. This reduction in weight reduces manufacturing costs because less steel is needed in making the carts.

Thus, a novel push-back storage system has been shown and described. Various changes and substitutions can of course be made without departing from the spirit and scope of the invention. The invention, therefore, should not be limited except by the following claims and their equivalents.

The invention claimed is:

1. A push-back storage system, comprising:
a rack structure forming vertically stacked lanes;
a single pair of push-back rails in each of the lanes, with the pair including a left side push-back rail and right side push-back rail, and with the left and right side push-back rails each having upper and lower inner flanges joined to a web section, and with the inner flanges of the left and right side push-back rails extending towards each other;
a respective fourth cart having outer left and right front wheels and left and right back wheels rolling on the lower inner flanges of the left and right side push-back rails, and with the fourth cart having left and right side rails;
a respective third cart having outer left and right front wheels rolling on lower inside left and right flanges of said left and right side rails of the fourth cart, and having outer left and right back wheels rolling on the lower inner flanges of the left and right push-back rails, respectively;
a respective second cart having outer left and right front wheels rolling on lower inside left and right flanges of left and right side rails of the third cart, and having outer left and right back wheels rolling on the lower inner left and right flanges of the left and right push-back rails, respectively, with the second cart having left and right side top flanges each extending laterally outwardly over the left and right side rails of the fourth cart;
a respective first cart having left and right front and left and right back inner facing wheels rolling on a top surface of the left and right push-back rails, respectively, with the first cart having front, back, left and right side members joined to each other, and with vertical sections joined to the first cart to provide wheel supports; and
left and right anti-liftoff channel sections attached to a bottom surface of the first cart and extending under said left and right side top flanges on the second cart to prevent the first cart from lifting off of the second cart, and with the left and right anti-liftoff channel sections vertically above the left and right side rails of the fourth cart.

2. The push-back storage system of claim 1 wherein the push-back rails are substantially C-shaped channel sections.

3. The push-back storage system of claim 1 wherein the first cart is shorter than the second cart.

4. The push-back storage system of claim 1 wherein the first cart is wider than each of the second, third and fourth carts.

5. The push-back storage system of claim 1 wherein the first cart has a width greater than the dimension between the web section of the left and right side push-back rails.

6. The push-back storage system of claim 1 with the first cart including left and right inwardly projecting lips extending under left and right retaining blocks on the left and right push-back rails, respectively.

7. The push-back storage system of claim 1 with all of the wheels on the first cart comprising flanged wheels, and with all of the wheels on the second and third carts comprising un-flanged wheels.

8. The push-back storage system of claim 1 with each wheel on the first cart rotatably attached to a substantially horizontal axle, and with each wheel on the second cart and on the third cart attached to an axle extending upwardly at an acute angle.

9. The push-back storage system of claim 1 with each push-back rail comprising a C-channel section, and with only the front left and right and the back left and right inner facing wheels of the first cart rolling on the top surface of the push-back rails.

10. A push-back storage system, comprising:
a rack structure forming vertically stacked lanes;
a single pair of C-shaped channel section push-back rails in each of the lanes, with the pair including a left side push-back rail and right side push-back rail, and with the left and right side push-back rails each having upper and lower inner flanges joined to a web section, and with the inner flanges of the left and right side push-back rails extending towards each other;

a respective fourth cart having outer left and right front wheels and left and right back wheels rolling on the lower inner flanges of the left and right side push-back rails, and with the fourth cart having left and right side rails;

a respective third cart having outer left and right front wheels rolling on lower inside left and right flanges of said left and right side rails of the fourth cart, and having outer left and right back wheels rolling on the lower inner flanges of the left and right push-back rails, respectively;

a respective second cart having outer left and right front wheels rolling on lower inside left and right flanges of left and right side rails of the third cart, and having outer left and right back wheels rolling on the lower inner left and right flanges of the left and right push-back rails, respectively, with the second cart having left and right side top flanges each extending laterally outwardly over the left and right side rails of the fourth cart; and a respective first cart having left and right front and left and right back inner facing wheels rolling on a top surface of the left and right push-back rails, respectively, with the first cart having front, back, left and right side members joined to each other, and with vertical sections joined to the first cart to provide wheel supports;

with only the front left and right and the back left and right inner facing wheels of the first cart rolling on the top surface of the push-back rails, and with all of the wheels on the first cart comprising flanged wheels, and with all of the wheels on the second and third carts comprising un-flanged wheels;

with each wheel on the first cart rotatably attached to a substantially horizontal axle, and with each wheel on the second cart and on the third cart attached to an axle extending upwardly at an acute angle; and left and right anti-liftoff channel sections attached to a bottom surface of the first cart and with the left and right side top flanges of the second cart extending into the left and right anti-liftoff channel sections, respectively, to prevent the first cart from lifting away from the second cart.

\* \* \* \* \*